United States Patent
Yamazaki (10) Patent No.: US 12,143,214 B2
(45) Date of Patent: *Nov. 12, 2024

(54) ERROR TOLERANT COMMUNICATION CIRCUIT AND ERROR TOLERANT COMMUNICATION

(71) Applicant: LAPIS Technology Co., Ltd., Yokohama (JP)

(72) Inventor: Atsushi Yamazaki, Yokohama (JP)

(73) Assignee: LAPIS Technology Co., Ltd., Yokohama (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/190,130

(22) Filed: Mar. 27, 2023

(65) Prior Publication Data

US 2023/0318743 A1 Oct. 5, 2023

(30) Foreign Application Priority Data

Mar. 31, 2022 (JP) .................................. 2022-059689

(51) Int. Cl.
*H04L 1/00* (2006.01)
*H04L 5/00* (2006.01)

(52) U.S. Cl.
CPC .......... *H04L 1/0072* (2013.01); *H04L 5/0055* (2013.01)

(58) Field of Classification Search
CPC ... H04L 1/0072; H04L 5/0055; H04L 1/0045; H04L 1/12; H04L 1/0061; H04L 12/1868; H04L 1/0081; H04L 2001/125
See application file for complete search history.

(56) References Cited

U.S. PATENT DOCUMENTS

| | | | | |
|---|---|---|---|---|
| 6,550,023 B1 * | 4/2003 | Brauch | .................. | G11C 29/40 714/719 |
| 6,782,503 B1 * | 8/2004 | Dawson | .................. | H04L 43/50 714/739 |
| 6,931,581 B1 * | 8/2005 | Cassiday | ............... | H04L 1/0041 714/776 |
| 8,560,932 B2 * | 10/2013 | Kleihorst | ........... | G01R 31/3193 714/736 |
| 10,110,360 B2 * | 10/2018 | Bressanelli | ........... | H04L 5/0055 |
| 2012/0324320 A1 * | 12/2012 | Terabe | ..................... | G06F 11/10 375/295 |
| 2016/0353430 A1 * | 12/2016 | Chen | ..................... | H04L 5/0053 |

(Continued)

FOREIGN PATENT DOCUMENTS

JP     2009004890     1/2009

*Primary Examiner* — Steve N Nguyen
(74) *Attorney, Agent, or Firm* — JCIPRNET (57) ABSTRACT

An error tolerant communication circuit includes an acquisition part that acquires a packet, in packet communication in which data is divided into units of packets and transmitted, including a control flag for controlling the packet communication and a CRC code and received from an external device; a storage part that stores, in advance, an inspection packet including at least one of a packet including a control flag indicating an ACK acknowledgment and a CRC code corresponding to the ACK acknowledgment, and a packet including a control flag indicating a negative acknowledgment and a CRC code corresponding to the negative acknowledgment; and a detection part that compares the received packet and the inspection packet with each other and detects a bit error with respect to the received packet.

7 Claims, 8 Drawing Sheets

(56) References Cited

U.S. PATENT DOCUMENTS

| | | | |
|---|---|---|---|
| 2019/0090208 A1* | 3/2019 | Seo ........................ | H04W 52/36 |
| 2020/0252158 A1* | 8/2020 | Shen ...................... | H04L 1/0041 |
| 2021/0376960 A1* | 12/2021 | Huang .............. | H04W 72/0446 |
| 2023/0318742 A1* | 10/2023 | Yamazaki ............. | H04L 1/0061 |
| | | | 714/726 |

* cited by examiner

When ack acknowledgment (ACK) or negative acknowledgment (NACK) is transmitted:

When ADR and DATA are transmitted:

FIG. 4

| | bit7 | bit6 | bit5 | bit4 | bit3 | bit2 | bit1 | bit0 | Number of ADR bytes | Number of DATA bytes |
|---|---|---|---|---|---|---|---|---|---|---|
| Start W | 0 | 0 | ALEN1 | ALEN0 | DLEN3 | DLEN2 | DLEN1 | DLEN0 | 1~4 | 1~16 |
| Start R | 0 | 1 | ALEN1 | ALEN0 | DLEN3 | DLEN2 | DLEN1 | DLEN0 | 1~4 | 0 |
| ACK | 1 | 0 | 0 | 0 | 0 | 0 | 0 | 0 | 0 | 0 |
| NACK | 1 | 0 | 0 | 0 | 0 | 0 | 0 | 1 | 0 | 0 |
| Read data | 1 | 1 | 0 | 0 | DLEN3 | DLEN2 | DLEN1 | DLEN0 | 0 | 1~16 |
| Path reset | 1 | 1 | 1 | 1 | 1 | 1 | 1 | 1 | 0 | 0 |

ERROR TOLERANT COMMUNICATION CIRCUIT AND ERROR TOLERANT COMMUNICATION

CROSS-REFERENCE TO RELATED APPLICATION

This application claims priority under 35 USC 119 from Japanese Patent Application No. 2022-059689 filed on Mar. 31, 2022, the disclosure of which is incorporated by reference herein.

BACKGROUND

Technical Field

The disclosure relates to an error tolerant communication circuit and an error tolerant communication method.

Description of Related Art

In transmission and reception of a packet between devices, there is a communication method in which, when one device transmits a packet, the other device which has received the packet returns a packet indicating a reception result to secure reliability of communication.

For example, Patent Document 1 (Japanese Patent Laid-Open No. 2009-004890) discloses a technology in which it is judged whether or not control information of a control packet returned from a reception-side device is normal, it is estimated whether an acknowledgment included in the control information is a confirmation acknowledgment or a negative acknowledgment when it is judged that the control information of the control packet is not normal, and a data packet is retransmitted when it is not estimated that the acknowledgment is a confirmation acknowledgment.

In the communication method, for example, when one device cannot receive a packet indicating a reception result with respect to a transmitted packet, or when the other device has received a returned negative acknowledgment, the one device determines that the packet has not been able to be transmitted and received normally and retransmits a packet. Here, when a packet indicating a reception result cannot be received, the one device stands by until a predetermined period generated by a timeout elapses and retransmits a packet.

However, when a slight bit error has occurred in a packet indicating a reception result, even if the packet has a reception result that can be estimated, the one device may stand by until a timeout is generated and retransmit a packet. That is, when a bit error has occurred in a packet indicating a reception result, a standby period until an unnecessary timeout is generated, which may deteriorate communication efficiency.

The disclosure provides an error tolerant communication circuit in which communication efficiency can be improved even when a bit error has occurred in a packet, and an error tolerant communication method.

SUMMARY

According to an embodiment, an error tolerant communication circuit includes an acquisition part that acquires a packet, in packet communication in which data is divided into units of packets and transmitted, including a control flag for controlling the packet communication and a CRC code and received from an external device; a storage part that stores, in advance, an inspection packet including at least one of a packet including a control flag indicating an ACK acknowledgment and a CRC code corresponding to the ACK acknowledgment, and a packet including a control flag indicating a negative acknowledgment and a CRC code corresponding to the negative acknowledgment; and a detection part that compares the received packet and the inspection packet with each other and detects a bit error with respect to the received packet.

According to another embodiment, an error tolerant communication method executes processing including acquiring a packet, in packet communication in which data is divided into units of packets and transmitted, including a control flag for controlling the packet communication and a CRC code and received from an external device; storing, in advance, an inspection packet including at least one of a packet including a control flag indicating an ACK acknowledgment and a CRC code corresponding to the ACK acknowledgment, and a packet including a control flag indicating a negative acknowledgment and a CRC code corresponding to the negative acknowledgment; and comparing the received packet and the inspection packet with each other and detecting a bit error with respect to the received packet.

DESCRIPTION OF THE EMBODIMENTS

First Embodiment

Hereinafter, an exemplary embodiment of the disclosure will be described in detail with reference to the drawings.

Figure 1:
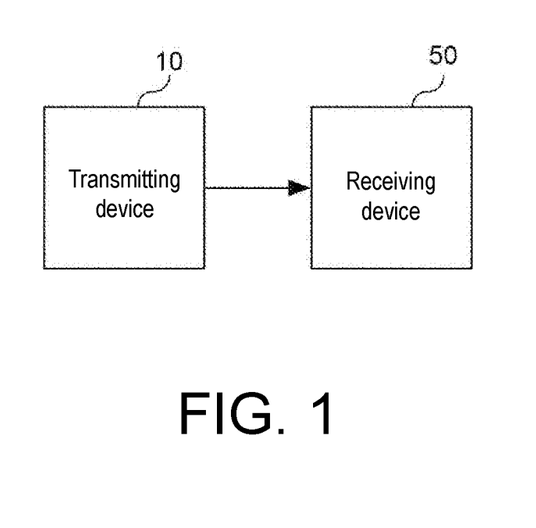
FIG. 1 is a block diagram showing an example of a constitution of a communication system according to a first embodiment.

FIG. 1 is a schematic view illustrating an example of a constitution of a communication system 1 according to the present embodiment.

As an example, as illustrated in FIG. 1, the communication system 1 is constituted to include a transmitting device 10 transmitting a packet in packet communication by division into respective packets, and a receiving device 50 receiving a packet which has been transmitted from the transmitting device 10.

When a packet is transmitted, the transmitting device 10 transmits a packet obtained by applying an error detection code to a transmitting packet to the receiving device 50. Here, the error detection code according to the present embodiment is a cyclic redundancy check (CRC) code derived by a CRC method. The transmitting device 10 selects a CRC code of 8 bits (which will hereinafter be referred to as an "8-bit CRC code") or a CRC code of 16 bits (which will hereinafter be referred to as a "16-bit CRC code") in accordance with the data length of a packet, assigns the selected CRC code to a packet, and transmits the packet.

In the present embodiment, a form in which assigned CRC codes are the 8-bit CRC code and the 16-bit CRC code will be described, but the embodiment is not limited to this. The CRC code may be a 32-bit CRC code, a 64-bit CRC code, or a 128-bit CRC code, and it may be any CRC code. In addition, in the present embodiment, a form in which a CRC code is selected from a combination of an 8-bit CRC code and a 16-bit CRC code will be described, but the embodiment is not limited to this. A CRC code may be selected from a combination of an 8-bit CRC code and a 32-bit CRC code or may be selected from a combination of a 16-bit CRC code and a 32-bit CRC code. A combination of any CRC codes may be adopted as long as they are CRC codes that can be applied to a transmitting packet.

The receiving device 50 receives a packet from the transmitting device 10 and inspects whether or not there are an error and corruption in a received packet using the CRC code included in the received packet.

Figure 2:
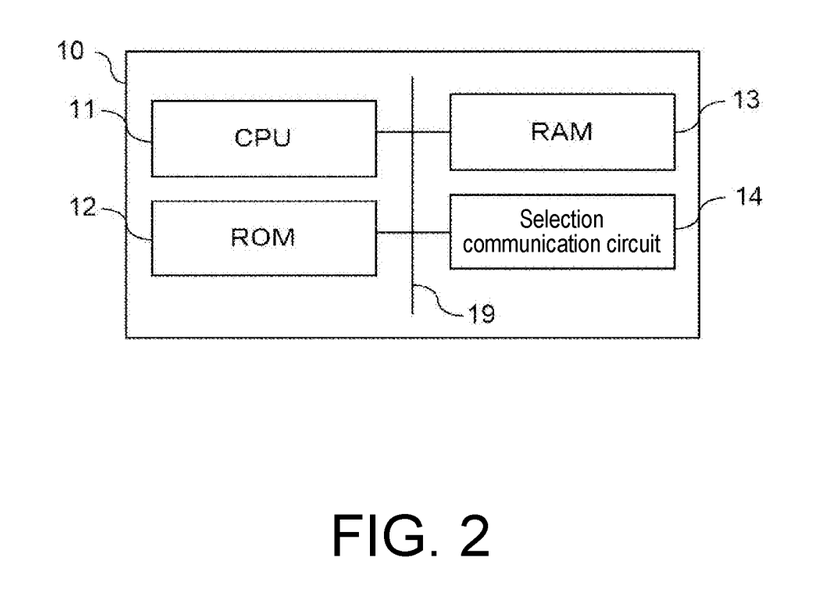
FIG. 2 is a block diagram showing an example of a constitution of a transmitting device according to the first embodiment.

Next, a constitution of the transmitting device 10 will be described with reference to FIG. 2. FIG. 2 is a block diagram showing an example of a constitution of the transmitting device 10 according to the present embodiment.

As illustrated in FIG. 2, the transmitting device 10 according to the present embodiment is constituted to include a central processing unit (CPU) 11, a read only memory (ROM) 12, a random access memory (RAM) 13, and a selection communication circuit 14. The CPU 11, the ROM 12, the RAM 13, and the selection communication circuit 14 are connected to each other by a bus 19.

The CPU 11 generalizes and controls the transmitting device 10 in its entirety. The ROM 12 stores data and the like. The RAM 13 is a memory used as a work area when processing is executed.

The selection communication circuit 14 selects the 8-bit CRC code or the 16-bit CRC code depending on a packet, assigns the selected CRC code to the packet, and transmits the packet.

Figure 3:
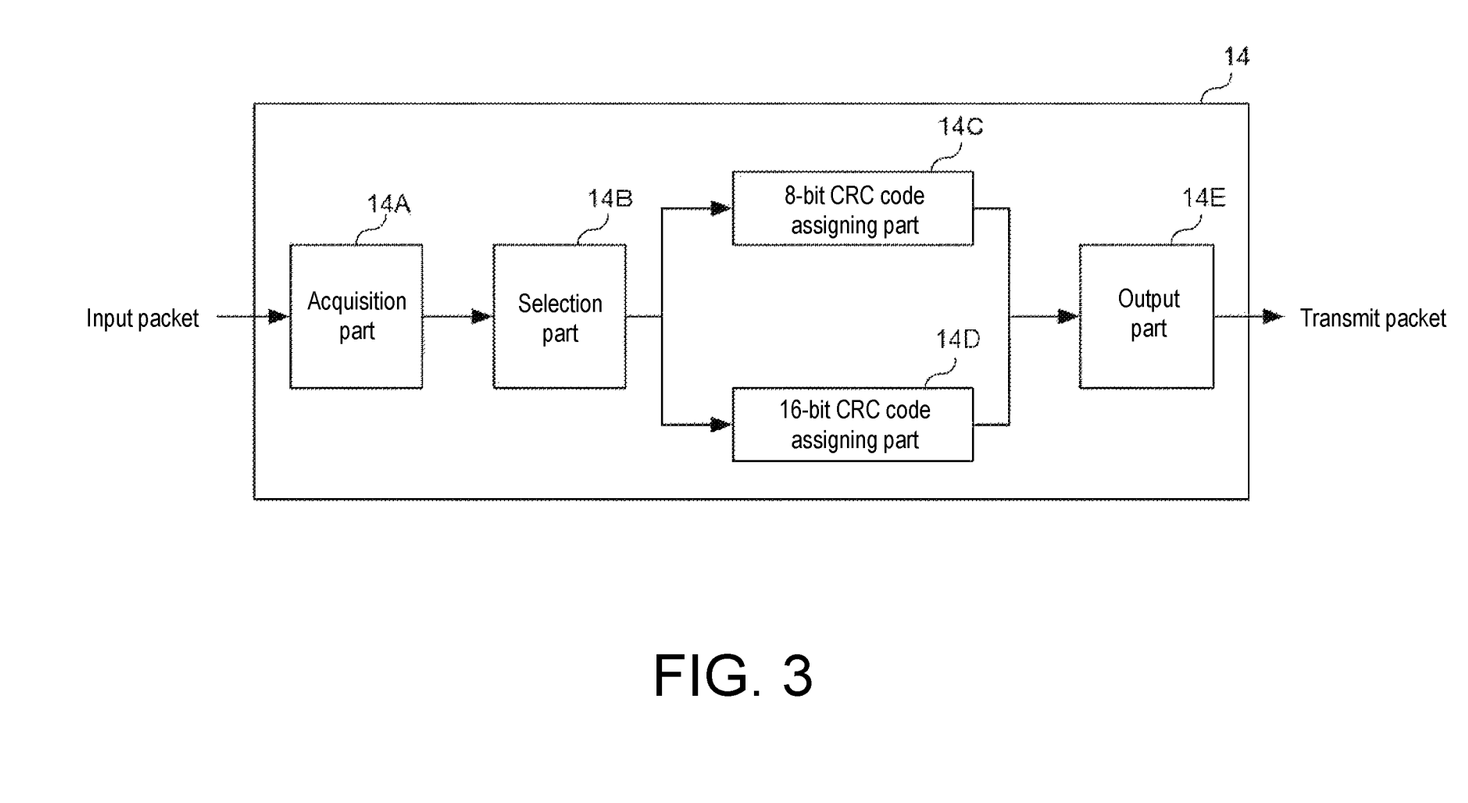
FIG. 3 is a block diagram showing an example of a constitution of a selection communication circuit according to the first embodiment.

Next, a constitution of the selection communication circuit 14 will be described with reference to FIG. 3. FIG. 3 is a block diagram showing an example of a constitution of the selection communication circuit 14 according to the present embodiment.

As an example, as illustrated in FIG. 3, the selection communication circuit 14 includes an acquisition part 14A, a selection part 14B, an 8-bit CRC code assigning part 14C, a 16-bit CRC code assigning part 14D, and an output part 14E.

The acquisition part 14A acquires a packet input to the selection communication circuit 14.

The selection part 14B selects a CRC code to be assigned depending on the acquired packet. Specifically, the selection part 14B selects the 8-bit CRC code assigning part 14C (which will be described below) or the 16-bit CRC code assigning part 14D (which will be described below) in accordance with the data length of the acquired packet and selects a CRC code to be assigned.

Figure 4:
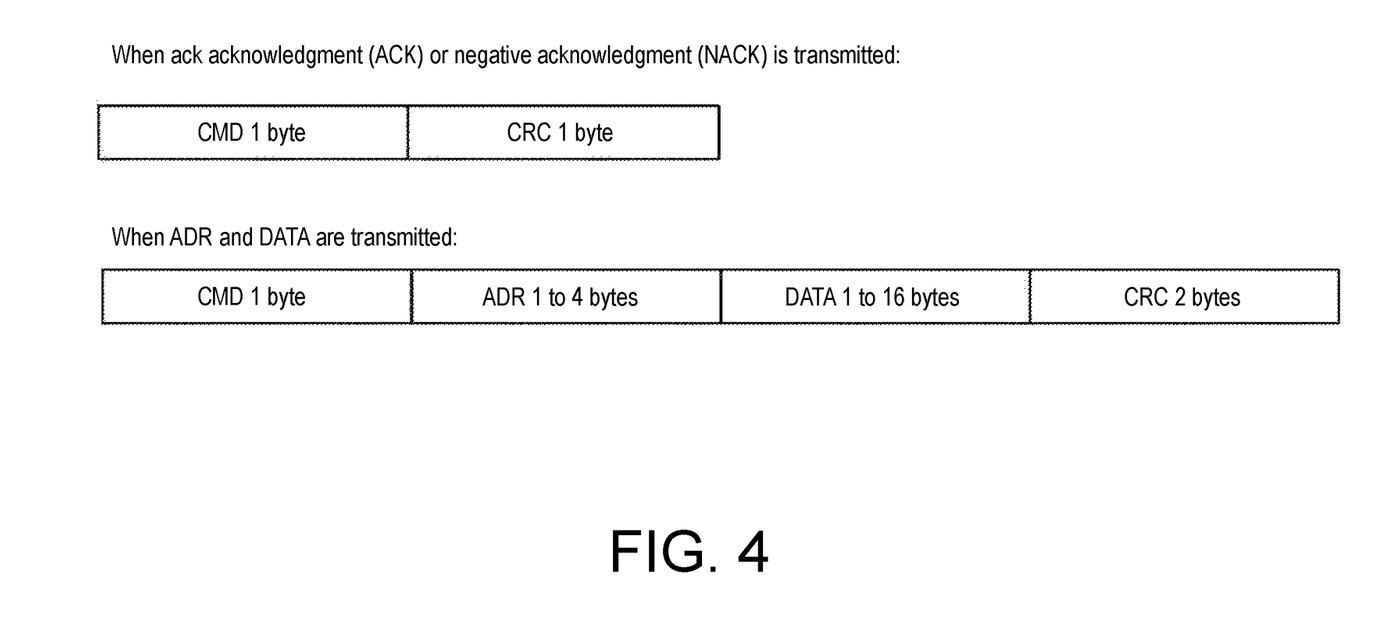
FIG. 4 is a schematic view illustrating an example of a constitution of a packet according to the first embodiment.

As an example, as illustrated in FIG. 4, the packet according to the present embodiment is constituted to include a CMD (command) indicating a control flag for controlling communication, an ADR indicating an address, a DATA indicating data, and a CRC indicating a CRC code. When a packet indicating a reception result such as an ACK acknowledgment or a negative acknowledgment is transmitted, the transmitting device 10 transmits a packet constituted to have a 1-byte CMD and a 1-byte CRC. In addition, for example, when a packet including an ADR and a DATA is transmitted, the transmitting device 10 transmits a packet constituted to have a 1-byte CMD, a 1 to 4-byte ADR, a 1 to 16-byte DATA, and a 2-byte CRC.

When an acquired packet includes only a CMD, the selection part 14B inputs the packet to the 8-bit CRC code assigning part 14C (which will be described below), and when an acquired packet includes an ADR and a DATA, the selection part 14B inputs the packet to the 16-bit CRC code assigning part 14D (which will be described below).

Figure 5:
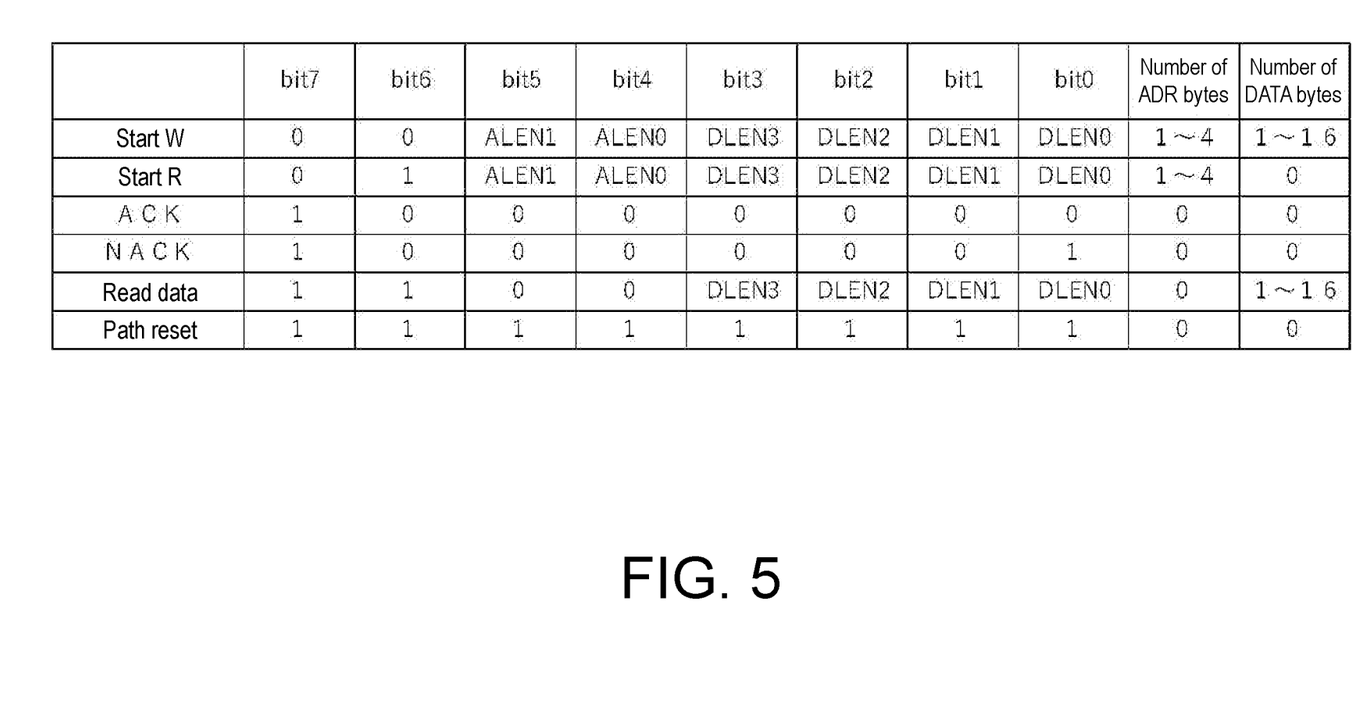
FIG. 5 is a view illustrating an example of a control flag in a command according to the first embodiment.

A form in which the selection part 14B according to the present embodiment selects the 8-bit CRC code assigning part 14C or the 16-bit CRC code assigning part 14D in accordance with the data included in a packet has been described, but the embodiment is not limited to this. The selection part 14B may select the 8-bit CRC code assigning part 14C or the 16-bit CRC code assigning part 14D in accordance with the control flag included in a CMD. For example, as illustrated in FIG. 5, a CMD is constituted of an 8-bit control flag (bit0 to bit7), and an ACK acknowledgment (ACK) and a negative acknowledgment (NACK) can be identified by referring to bit0 and bit7. In addition, bit0 to bit3 indicate the data length of the DATA, and bit4 to bit5 indicate the data length of the ADR. Therefore, the data lengths of the DATA and the ADR can be judged by referring to bit0 to bit5.

For example, when "1" is set to only bit7, or when "1" is set to only bit0 and bit7, the selection part 14B may judge that the packet indicates an ACK acknowledgment or a negative acknowledgment and select the 8-bit CRC code assigning part 14C. In addition, the selection part 14B judges the data length of the DATA using the control flag of the CMD, and when the data length is 1 byte or greater, the selection part 14B may judge that the packet includes an ADR and a DATA and select the 16-bit CRC code assigning part 14D.

The 8-bit CRC code assigning part 14C derives an 8-bit CRC code using the acquired packet and assigns the derived CRC code to the acquired packet. When the acquired packet includes only a CMD, the 8-bit CRC code assigning part 14C performs CRC computation with respect to the CMD, derives an 8-bit (1-byte) CRC code, and assigns the derived 8-bit CRC code to the packet.

The 16-bit CRC code assigning part 14D derives a 16-bit CRC code using the acquired packet and assigns the derived CRC code to the acquired packet. When the acquired packet includes a CMD, an ADR, and a DATA, the 16-bit CRC code assigning part 14D performs CRC computation with respect to the CMD, the ADR, and the DATA, derives a 16-bit (2-byte) CRC code, and assigns the derived 16-bit CRC code to the packet.

The output part 14E transmits and outputs the packet to which a CRC code is assigned to an external device.

Figure 6:
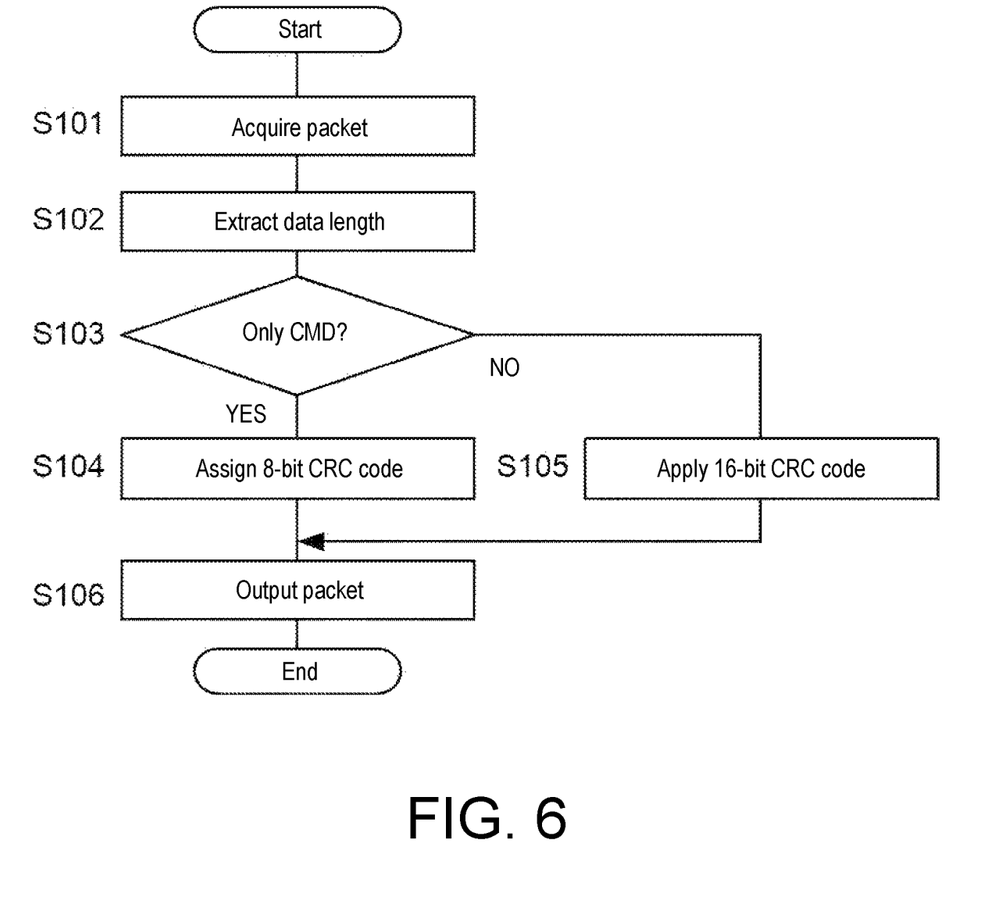
FIG. 6 is a flowchart showing an example of a flow of a method for selecting a CRC code according to the first embodiment.

Next, a method for selecting a CRC code according to the present embodiment will be described with reference to FIG. 6. FIG. 6 is a flowchart showing an example of a method for selecting a CRC code according to the present embodiment.

In Step S101, the selection communication circuit 14 acquires an input packet.

In Step S102, the selection communication circuit 14 extracts the data length of the packet.

In Step S103, the selection communication circuit 14 judges whether or not the packet includes only a CMD. When the packet includes only a CMD (Step S103: YES), the selection communication circuit 14 proceeds to Step S104. On the other hand, when the packet includes not only a CMD (an ADR and a DATA are included) (Step S103: NO), the selection communication circuit 14 proceeds to Step S105.

In Step S104, the selection communication circuit 14 inputs the packet to the 8-bit CRC code assigning part 14C and assigns an 8-bit CRC code to the packet.

In Step S105, the selection communication circuit 14 inputs the packet to the 16-bit CRC code assigning part 14D and assigns a 16-bit CRC code to the packet.

In Step S106, the selection communication circuit 14 transmits and outputs the packet to which a CRC code is assigned to the external device.

As described above, according to the present embodiment, even when reliability of transmission and reception of a packet has been secured, communication efficiency can be improved.

In the foregoing embodiment, a form in which the selection communication circuit 14 includes the selection part 14B selecting a CRC code and the output part 14E transmitting a packet to an external device has been described, but the embodiment is not limited to this. The selection part 14B selecting a CRC code and the output part 14E transmitting a packet to an external device may be included in different circuits, respectively.

In addition, in the foregoing embodiment, a form in which an 8-bit CRC code is selected when the CMD indicates an ACK acknowledgment or a negative acknowledgment has been described, but the embodiment is not limited to this. When the CMD is a path reset (all control flags are "1"), an 8-bit CRC code may be selected.

Second Embodiment

In the first embodiment, a form in which the transmitting device 10 transmitting a packet selects a CRC code to be assigned depending on a packet has been described. In the present embodiment, a form in which the receiving device 50 receives a packet will be described.

In the related art, when there is a 1-bit error in a received packet, the receiving device 50 determines that a packet has not been able to be transmitted and received normally, and the receiving device 50 may return a negative acknowledgment and request retransmission of a packet. Regarding the receiving device 50 according to the present embodiment, a form in which, when a bit having an error is within 1 bit in a received packet, the receiving device 50 tolerates the error and receives the packet will be described.

For example, when a bit error included in a received packet is 1 bit, in consideration of the CMD and the CRC code, the acknowledgment indicated by the received packet and other acknowledgments can be distinguished from each other. Specifically, in the control flag of the CMD, if bit7 is "1", it is possible to distinguish that the packet indicates an ACK acknowledgment and a negative acknowledgment. However, when there is an error of 2 bits or greater in a received packet, the acknowledgment indicated by the received packet and other acknowledgments may not be able to be distinguished from each other.

For this reason, a form in which the receiving device 50 according to the present embodiment compares a packet indicating a received ACK acknowledgment or a negative acknowledgment and a packet corresponding to a stored ACK acknowledgment or a negative acknowledgment with each other and detects whether or not the difference (bit error) is 1 bit will be described.

Hereinafter, since the constitution of the communication system (refer to FIG. 1), the constitution of the transmitting device 10 (refer to FIG. 2), the constitution of the selection communication circuit 14 (refer to FIG. 3), the data constitution of a packet (refer to FIG. 4), an example of a control flag (refer to FIG. 5), and the method for selecting a CRC code (refer to FIG. 6) are similar to those of the first embodiment, description thereof will be omitted.

Figure 7:
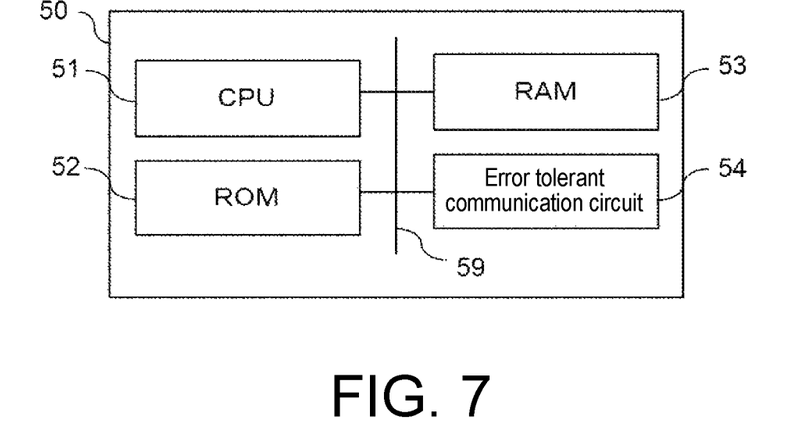
FIG. 7 is a block diagram showing an example of a constitution of a receiving device according to a second embodiment.

A constitution of the receiving device 50 will be described with reference to FIG. 7. FIG. 7 is a block diagram showing an example of a constitution of the receiving device 50 according to the present embodiment.

As illustrated in FIG. 7, the receiving device 50 according to the present embodiment is constituted to include a CPU 51, a ROM 52, a RAM 53, and an error tolerant communication circuit 54. The CPU 51, the ROM 52, the RAM 53, and the error tolerant communication circuit 54 are connected to each other by a bus 59. Since the CPU 51, the ROM 52, and the RAM 53 are similar to the CPU 11, the ROM 12, and the RAM 13 described above, description thereof will be omitted.

When a packet is received from an external device and the received packet includes only a CMD and a CRC code, the error tolerant communication circuit 54 judges whether or not an error and corruption have occurred with respect to the packet.

Figure 8:
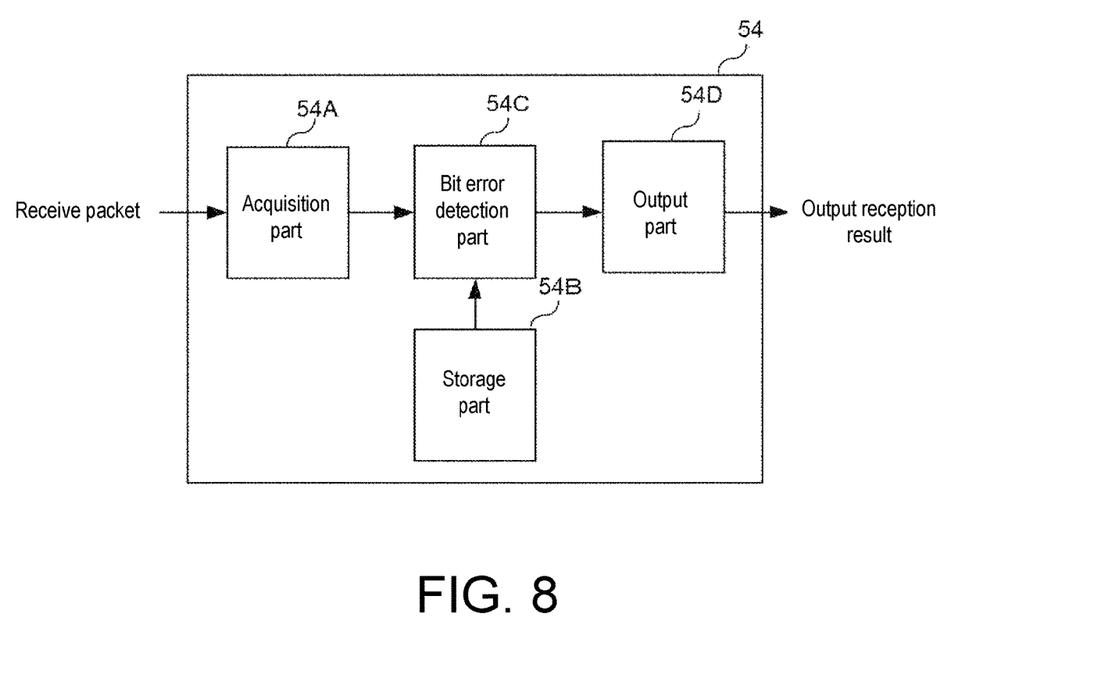
FIG. 8 is a block diagram showing an example of a constitution of an error tolerant communication circuit according to the second embodiment.

Next, a constitution of the error tolerant communication circuit 54 will be described with reference to FIG. 8. FIG. 8 is a block diagram showing an example of a constitution of the error tolerant communication circuit 54 according to the present embodiment.

As an example, as illustrated in FIG. 8, the error tolerant communication circuit 54 includes an acquisition part 54A, a storage part 54B, a bit error detection part 54C, and an output part 54D.

The acquisition part 54A acquires a packet received from an external device.

The storage part 54B stores a packet corresponding to an ACK acknowledgment (which will hereinafter be referred to as an "ACK acknowledgment packet") and a packet corresponding to a negative acknowledgment (which will hereinafter be referred to as a "negative acknowledgment packet"). An ACK acknowledgment packet is a packet constituted to have a CMD indicating an ACK acknowledgment and a CRC code corresponding to the ACK acknowledgment, and a negative acknowledgment packet is a packet constituted to have a CMD indicating a negative acknowledgment and a CRC code corresponding to the negative acknowledgment. Here, an ACK acknowledgment packet and a negative acknowledgment packet are examples of an "inspection packet".

The bit error detection part 54C compares a received packet with an ACK acknowledgment packet and a negative acknowledgment packet stored in the storage part 54B for each bit using exclusive OR (XOR) computation and detects a difference (bit error).

Figure 9:
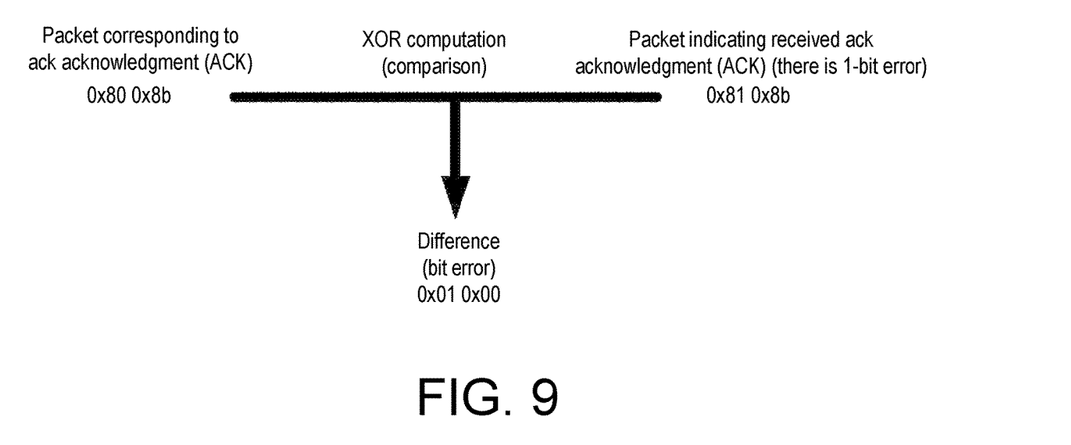
FIG. 9 is a schematic view illustrating an example of a comparison of packets according to the second embodiment.

As an example, as illustrated in FIG. 9, the bit error detection part 54C can detect a difference (bit error) when a comparison is performed by performing XOR computation of a CMD indicating an ACK acknowledgment (ACK) included in the received packet and a CRC code corresponding to the ACK acknowledgment, and a CMD of the stored ACK acknowledgment and a CRC code corresponding to the ACK acknowledgment.

For example, it is assumed that an ACK acknowledgment packet is "0×80 0×8b". In addition, it is assumed that a received packet is corrupted in the middle of communication, resulting in occurrence of a bit error so that a packet indicating a received ACK acknowledgment becomes "0×81 0×8b". The bit error detection part 54C compares the CMD and the CRC code included in the received packet and the CMD and the CRC code corresponding to the ACK acknowledgment with each other for each bit through XOR computation and detects "0×01 0×00" indicating a difference (bit error) of 1 bit as a comparison result.

The bit error detection part 54C judges that an ACK acknowledgment (ACK) has been received if the difference (bit error) is within 1 bit. In addition, similarly, the bit error detection part 54C compares the received packet and the negative acknowledgment packet with each other for each bit and detects a bit error of 1 bit. If the difference (bit error) is within 1 bit, it is judged that a negative acknowledgment (NACK) has been received.

In addition, regarding a method for judging whether or not a difference (bit error) is within 1 bit from a comparison result, there is a method in which a bit of "1" is searched for in each of left and right directions in a bit string and compares first detected positions with each other. For example, the bit string, which is a result of the XOR computation described above, is shifted in directions of each of the rightward direction (lower-order bit direction) and the leftward direction (higher-order bit direction) for searching. When the positions of the bits which have been detected first through searching in each of the directions are stored and the detected positions are the same, it is detected that there is a 1-bit error in the result of XOR computation. On the other hand, when the positions of the bits which have been detected first through searching in each of the directions differ, it is detected that there is an error of 2 bits or greater. In addition, when a bit of "1" is not detected through searching in each of the directions, it is detected that there is no error.

The output part 54D outputs a received packet and an error detection result to the RAM 53.

Figure 10:
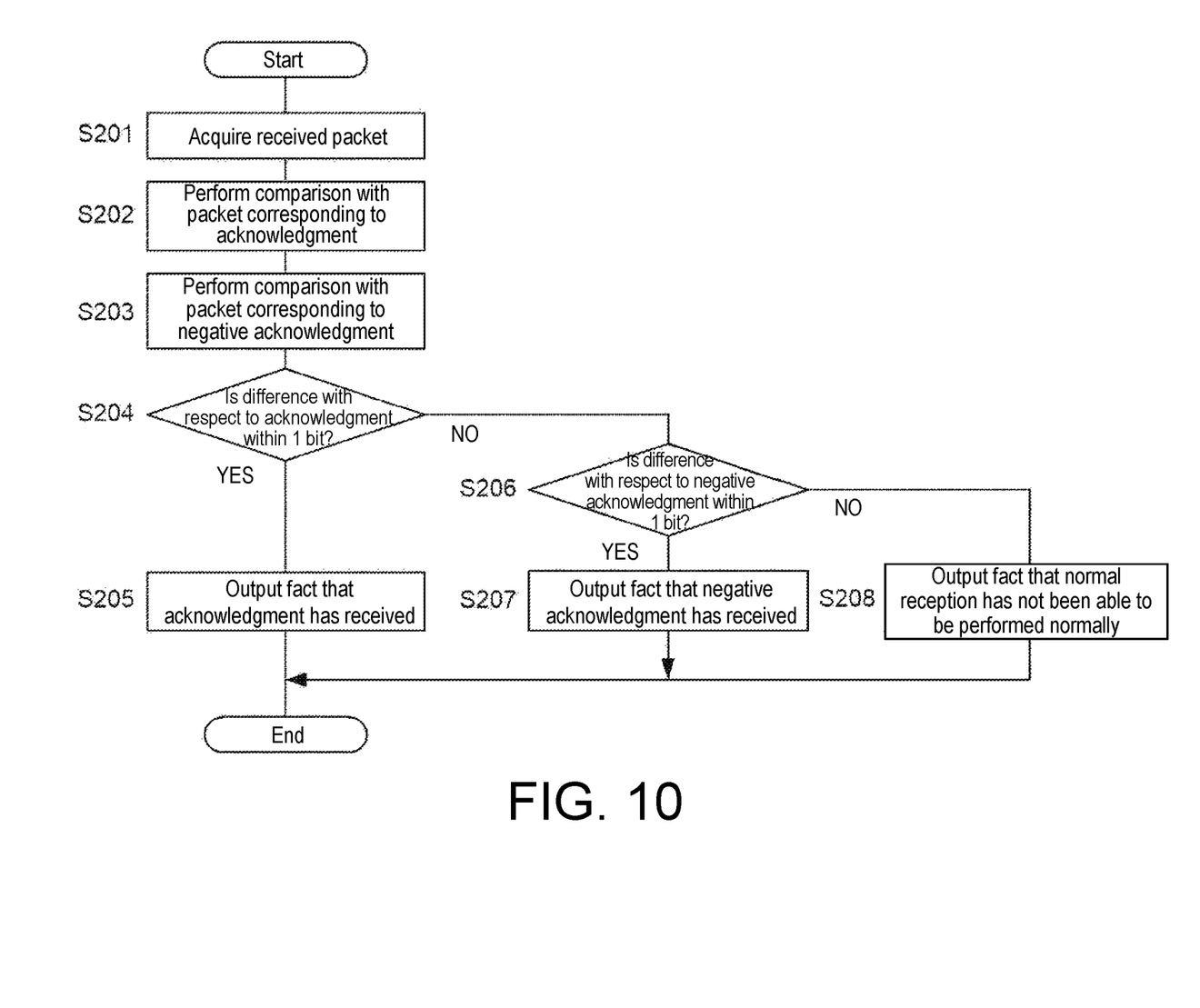
FIG. 10 is a flowchart showing an example of a flow of a method for detecting a bit error according to the second embodiment.

Next, a method for tolerating an error according to the present embodiment will be described with reference to FIG. 10. FIG. 10 is a flowchart showing an example of a method for tolerating an error according to the present embodiment.

In Step S201, the error tolerant communication circuit 54 acquires a packet received from an external device.

In Step S202, the error tolerant communication circuit 54 compares the received packet and the stored ACK acknowledgment packet with each other.

In Step S203, the error tolerant communication circuit 54 compares the received packet and the stored negative acknowledgment packet with each other.

In Step S204, as a result of a comparison between the received packet and the ACK acknowledgment packet, the error tolerant communication circuit 54 judges whether or not the difference (bit error) with respect to the ACK acknowledgment is within 1 bit. When the difference (bit error) with respect to the ACK acknowledgment packet is within 1 bit (Step S204: YES), the error tolerant communication circuit 54 proceeds to Step S205. On the other hand, when the difference (bit error) with respect to the ACK acknowledgment packet is not within 1 bit (the difference (bit error) with respect to the ACK acknowledgment packet exceeds 1 bit) (Step S204: NO), the error tolerant communication circuit 54 proceeds to Step S206.

In Step S205, as an error detection result, the error tolerant communication circuit 54 outputs the fact that the received packet and the ACK acknowledgment have been received.

In Step S206, the error tolerant communication circuit 54 judges whether or not the difference (bit error) between the received packet and the negative acknowledgment packet is within 1 bit. When the difference (bit error) with respect to the negative acknowledgment packet is within 1 bit (Step S206: YES), the error tolerant communication circuit 54 proceeds to Step S207. On the other hand, when the difference (bit error) with respect to the negative acknowledgment packet is not within 1 bit (the difference (bit error) with respect to the negative acknowledgment packet exceeds 1 bit) (Step S206: NO), the error tolerant communication circuit 54 proceeds to Step S208.

In Step S207, as an error detection result, the error tolerant communication circuit 54 outputs the fact that the received packet and the negative acknowledgment have been received.

In Step S208, as an error detection result, the error tolerant communication circuit 54 outputs the fact that the packet has not been able to be received normally.

As described above, even when a received packet has an error and corruption, the error and the corruption can be tolerated and the packet can be received, and therefore the frequency of retransmitting a packet can be reduced. That is, according to the present embodiment, while reliability of transmission and reception of a packet is secured, communication efficiency can be improved.

In the present embodiment, a form in which an error in a packet indicating an ACK acknowledgment and a negative acknowledgment is tolerated has been described, but the embodiment is not limited to this. An error in a packet indicating a path reset may be tolerated.

In addition, in the present embodiment, a form in which a bit error is detected by searching for bits in each of the left and right directions in a result of XOR computation has been described, but the embodiment is not limited to this. A bit error may be detected using a mask bit. For example, a bit error may be detected by comparing the result of XOR computation and a plurality of mask bits in which "1" is set to only 1 bit with each other and searching for corresponding masks.

In addition, in the present embodiment, a form in which a received packet, an ACK acknowledgment packet, and a negative acknowledgment packet are 2 bytes has been described, but the embodiment is not limited to this. A received packet, an ACK acknowledgment packet, and a negative acknowledgment packet may be 3 bytes or greater.

In addition, in the present embodiment, a form in which a comparison is performed by performing XOR computation of each of a received packet, an ACK acknowledgment packet, and negative acknowledgment packet has been described, but the embodiment is not limited to this. For example, a comparison may be performed by performing XOR computation of a received packet and a bit-inverted packet of each of an ACK acknowledgment packet and a negative acknowledgment packet. In this case, "0" in a comparison result becomes a bit error.

Third Embodiment

In the first embodiment, a form in which the transmitting device 10 including the selection communication circuit 14 transmits a packet has been described, and in the second embodiment, a form in which the receiving device 50 including the error tolerant communication circuit 54 receives a packet has been described. In the present embodiment, a form in which a transmitting/receiving device including the selection communication circuit 14 and the error tolerant communication circuit 54 transmits and receives a packet will be described.

Figure 11:
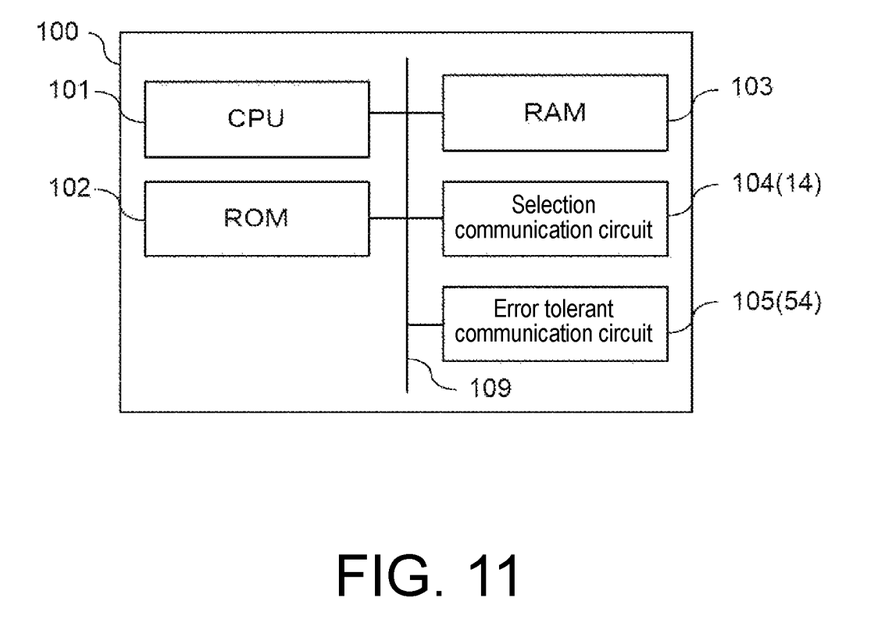
FIG. 11 is a block diagram showing an example of a constitution of a transmitting/receiving device according to a third embodiment.

A constitution of a transmitting/receiving device 100 will be described with reference to FIG. 11. FIG. 11 is a block diagram showing an example of a constitution of the transmitting/receiving device 100 according to the present embodiment.

As illustrated in FIG. 11, the transmitting/receiving device 100 according to the present embodiment is constituted to include a CPU 101, a ROM 102, a RAM 103, a selection communication circuit 104, and an error tolerant communication circuit 105. The CPU 101, the ROM 102, the RAM 103, the selection communication circuit 104, and the error tolerant communication circuit 105 are connected to each other by a bus 109. Since the CPU 101, the ROM 102, the RAM 103, the selection communication circuit 104, and the error tolerant communication circuit 105 are similar to the CPU 11, the ROM 12, the RAM 13, the selection communication circuit 14, and the error tolerant communication circuit 54 described above, description thereof will be omitted. That is, the transmitting/receiving device 100 includes the selection communication circuit 104 and the error tolerant communication circuit 105.

Figure 12:
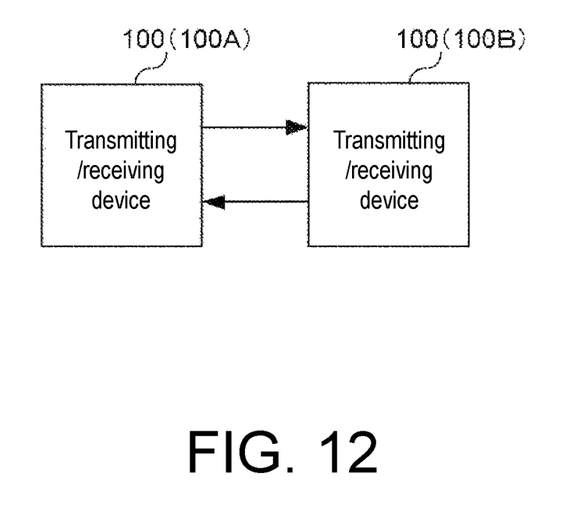
FIG. 12 is a block diagram showing an example of a constitution of a communication system according to the third embodiment.

As an example, as illustrated in FIG. 12, a transmitting/receiving device 100A communicates with another transmitting/receiving device 100B. For example, when a packet is transmitted, the transmitting/receiving device 100A assigns a CRC code and transmits a packet using the selection communication circuit 104, and when a packet is received, the transmitting/receiving device 100A detects a bit error and receives a packet using the error tolerant communication circuit 105.

As described above, according to the present embodiment, even when reliability of transmission and reception of a packet is secured, communication efficiency can be further improved.

The configurations of the receiver device, the transmitter device, and the transceiver device described above in the embodiments are examples, and the configurations may be modified without departing from the gist of the embodiments.

What is claimed is:

1. An error tolerant communication circuit comprising:
   an acquisition part that acquires a packet, in packet communication in which data is divided into units of packets and transmitted, including a control flag for controlling the packet communication and a CRC code and received from an external device;
   a storage part that stores, in advance, an inspection packet including a packet including a control flag indicating an ACK acknowledgment and a CRC code corresponding to the ACK acknowledgment, and a packet including a control flag indicating a negative acknowledgment and a CRC code corresponding to the negative acknowledgment; and
   a detection part that compares the received packet and the inspection packet with each other and detects a bit error with respect to the received packet.

2. The error tolerant communication circuit according to claim 1 further comprising:
   an output part that outputs a corresponding packet of either an ACK acknowledgment or a negative acknowledgment as a comparison result in response to a bit having a difference being within 1 bit after comparison between the received packet and the inspection packet.

3. The error tolerant communication circuit according to claim 2, wherein the detection part compares the received packet and the inspection packet with each other using an exclusive OR.

4. The error tolerant communication circuit according to claim 3, wherein the detection part detects a bit error through a bit shift of a computation result of an exclusive OR of the received packet and the inspection packet in directions of each of a higher-order direction and a lower-order direction and determines whether or not the bit error is within 1 bit.

5. The error tolerant communication circuit according to claim 1, wherein the detection part compares the received packet and the inspection packet with each other using an exclusive OR.

6. The error tolerant communication circuit according to claim 5, wherein the detection part detects a bit error through a bit shift of a computation result of an exclusive OR of the received packet and the inspection packet in directions of each of a higher-order direction and a lower-order direction and determines whether or not the bit error is within 1 bit.

7. An error tolerant communication method for executing processing comprising:
   acquiring a packet, in packet communication in which data is divided into units of packets and transmitted, including a control flag for controlling the packet communication and a CRC code and received from an external device;
   storing, in advance, an inspection packet including a packet including a control flag indicating an ACK acknowledgment and a CRC code corresponding to the ACK acknowledgment, and a packet including a control flag indicating a negative acknowledgment and a CRC code corresponding to the negative acknowledgment; and
   comparing the received packet and the inspection packet with each other and detecting a bit error with respect to the received packet.

* * * * *